(12) United States Patent
Wu et al.

(10) Patent No.: US 9,280,666 B2
(45) Date of Patent: Mar. 8, 2016

(54) METHOD AND ELECTRONIC DEVICE FOR PROTECTING DATA

(71) Applicants: Beijing Lenovo Software Ltd., Beijing (CN); Lenovo (Beijing) Co., Ltd., Beijing (CN)

(72) Inventors: Huijun Wu, Beijing (CN); Yufen You, Beijing (CN); Hai Yu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/229,918

(22) Filed: Mar. 30, 2014

(65) Prior Publication Data

US 2015/0059000 A1     Feb. 26, 2015

(30) Foreign Application Priority Data

Aug. 26, 2013   (CN) .......................... 2013 1 0376937

(51) Int. Cl.
| | |
|---|---|
| *G06F 21/62* | (2013.01) |
| *G06F 21/57* | (2013.01) |
| *G06F 9/44* | (2006.01) |
| *G06F 13/10* | (2006.01) |
| *G06F 21/44* | (2013.01) |
| *G06F 21/55* | (2013.01) |

(52) U.S. Cl.
CPC ............ *G06F 21/572* (2013.01); *G06F 9/4411* (2013.01); *G06F 9/4413* (2013.01); *G06F 13/102* (2013.01); *G06F 21/44* (2013.01); *G06F 21/554* (2013.01); *G06F 21/62* (2013.01)

(58) Field of Classification Search
CPC ................................ G06F 21/44; G06F 21/62
See application file for complete search history.

(56) References Cited

U.S. PATENT DOCUMENTS

| | | | |
|---|---|---|---|
| 7,814,481 B1 * | 10/2010 | Welder et al. ................. | 717/176 |
| 2004/0054952 A1 * | 3/2004 | Morrow et al. ............... | 714/742 |
| 2005/0071668 A1 * | 3/2005 | Yoon et al. .................... | 713/200 |
| 2007/0118768 A1 * | 5/2007 | Wolford ........................ | 713/193 |
| 2008/0307522 A1 * | 12/2008 | Shoji ..................... | G06F 3/0622 726/21 |
| 2014/0075169 A1 * | 3/2014 | Andrews et al. .................. | 713/2 |
| 2014/0294180 A1 * | 10/2014 | Link, II ......................... | 380/270 |

* cited by examiner

*Primary Examiner* — Jason K. Gee
*Assistant Examiner* — Zhimei Zhu
(74) *Attorney, Agent, or Firm* — Harness, Dickey & Pierce, P.L.C.

(57) ABSTRACT

A method and an electronic device for protecting data for a first electronic device with a data transmission interface are provided. A basic I/O system of the first electronic device is provided with a verification program for verifying a second electronic device. The method includes: loading the verification program into a memory of the first electronic device; verifying the second electronic device to acquire a verification result by the memory running the verification program via the memory; disabling the data transmission interface to cause the second electronic device to be unable to perform data transmission with the first electronic device by the data transmission interface in a case that the verification result indicates that the second electronic device is not a valid device.

14 Claims, 2 Drawing Sheets

METHOD AND ELECTRONIC DEVICE FOR PROTECTING DATA

The present application claims the priority to Chinese Patent Application No. 201310376937.4, entitled "METHOD AND ELECTRONIC DEVICE FOR PROTECTING DATA", filed on Aug. 26, 2013 with the State Intellectual Property Office of People's Republic of China, which is incorporated herein by reference in its entirety.

TECHNICAL FIELD

The present application relates the field of the electronic technology, and particularly relates to a method for protecting data.

BACKGROUND

With the development of the electronic technology, more and more electronic products have been developed, and more and more attention has been paid to the security of secret file data in an electronic device. Particularly, since the working with computers has been normal, most of the secret files related to the benefits of a user are directly stored in computers.

More and more enterprise customers especially pay attention to the security of secret file data in an electronic device. In order to prevent local data from being freely copied, the enterprise customers need to adopt technical means to isolate a data interface, for example, an USB storage device is filtered by using driver layer codes in a computer.

However, the inventor finds at least the following issues in the solution mentioned above.

Since the driver layer codes may be uninstalled on a level of an operating system, the local data may not be really protected. Therefore, there is a technical issue in the conventional technology: in the case of filtering a data transmission electronic device by using driver layer codes, the local data may not be really protected since the driver layer codes may be uninstalled on a level of an operating system.

SUMMARY

A method and an electronic device for protecting data are provided in the embodiments of the present application, which address the following technical issues in the conventional technology: in the case of filtering a data transmission electronic device by using driver layer codes, the local data may not be really protected since the driver layer codes may be uninstalled on a level of an operating system. Therefore, a technical effect of protecting the local data can be really realized.

An embodiment of the present application provides a method of protecting data for a first electronic device with a data transmission interface. The first electronic device is capable of performing data transmission with a second electronic device by the data transmission interface, and a basic I/O system of the first electronic device is provided with a verification program for verifying the second electronic device. The method includes: loading the verification program into a memory of the first electronic device when the second electronic device is connected to the first electronic device by the data transmission interface; verifying the second electronic device to acquire a verification result by the memory running the verification program; and disabling the data transmission interface to cause the second electronic device to be unable to perform data transmission with the first electronic device by the data transmission interface, in a case that the verification result indicates that the second electronic device is not a valid device.

Optionally, the loading the verification program into the memory of the first electronic device may include: loading the verification program from the basic I/O system into the memory of the first electronic device.

Optionally, before the loading the verification program into the memory of the first electronic device, the method may further include: loading the verification program from the basic I/O system into a hard disk of the first electronic device.

Optionally, the loading the verification program into the memory of the first electronic device may include: loading the verification program from the hard disk into the memory of the first electronic device.

Optionally, after the loading the verification program into the memory of the first electronic device, the method may further include: acquiring at least one monitoring program including a first monitoring program for monitoring the verification program by copying the verification program, where each of the at least one monitoring program is the same as the verification program.

Optionally, in a case that the at least one monitoring program includes only the first monitoring program, after the acquiring the at least one monitoring program including the first monitoring program for monitoring the verification program, the method may further include: loading the verification program into the memory of the first electronic device, in a case that it is determined that the first monitoring program or the verification program does not exist, by the first monitoring program and the verification program monitoring each other.

Optionally, after the acquiring the verification result, the method may further include: enabling the data transmission interface to cause the second electronic device to be able to perform data transmission with the first electronic device by the data transmission interface, in a case that the verification result indicates that the second electronic device is a valid device.

The present application further provides an electronic device, which includes: a data transmission interface by which the electronic device is capable of performing data transmission with a second electronic device; a basic I/O system, which is provided with a verification program for verifying the second electronic device; a memory; and a processor. The processor is configured to load the verification program into the memory in a case that the second electronic device is connected to the electronic device by the data transmission interface; verify the second electronic device to acquire a verification result by the memory running the verification program; disable the data transmission interface to cause the second electronic device to be unable to perform data transmission with the electronic device by the data transmission interface, in a case that the verification result indicates that the second electronic device is not a valid device.

Optionally, the processor may be configured to load the verification program from the basic I/O system into the memory.

Optionally, the electronic device may include a hard disk, and the processor may be further configured to load the verification program from the basic I/O system into the hard disk.

Optionally, the processor may be further configured to load the verification program from the hard disk into the memory.

Optionally, the processor may be configured to acquire at least one monitoring program including a first monitoring program for monitoring the verification program by copying the verification program, where each of the at least one monitoring program is the same as the verification program.

Optionally, the processor may be configured to load the verification program into the memory, in a case that it is detected that the first monitoring program or the verification program does not exist, by the first monitoring program and the verification program monitoring each other.

Optionally, the processor may be configured to enable the data transmission interface to cause the second electronic device to be able to perform data transmission with the electronic device by the data transmission interface in a case that the verification result indicates that the second electronic device is a valid device.

One or more technical solutions according to the embodiments of the present application have at least the following technical effects or advantages.

A method of protecting data for a first electronic apparatus is provided according to an embodiment of the present application. The basic I/O system of the first electronic device is provided with a verification program for verifying the second electronic device. The method includes: loading the verification program into a memory of the first electronic device; verifying the second electronic device to acquire a verification result by the memory running the verification program; disabling the data transmission interface to cause the second electronic device to be unable to perform data transmission with the first electronic device by the data transmission interface, in a case that the verification result indicates that the second electronic device is not a valid device. Therefore, according to the method of the embodiment, codes for filtering the second electronic device are written into the basic I/O system and thus the codes can not be deleted on a level of an operating system. Accordingly, the following technical issue is addressed: in a case of filtering a data transmission device by using driver layer codes, the local data can not be really protected since the driver layer codes may be uninstalled on a level of an operating system. Therefore, the technical effect of protecting the local data can be really realized.

DETAILED DESCRIPTION

A method for protecting data for a first electronic apparatus is provided in an embodiment of the present application, wherein a basic I/O system of the first electronic device is provided with a verification program for verifying a second electronic device. The method includes: loading the verification program into a memory of the first electronic device; verifying the second electronic device to acquire a verification result by the memory running the verification program; and disabling a data transmission interface to cause the second electronic device to be unable to perform data transmission with the first electronic device by the data transmission interface in a case that the verification result indicates that the second electronic device is not a valid device. Therefore, according to the method of the embodiment, codes for filtering the second electronic device are written into the basic I/O system and thus the codes can not be deleted on a level of an operating system. Accordingly, the following technical issue in the conventional technology is addressed: in a case of filtering a data transmission device by using driver layer codes, the local data can not be really protected since the driver layer codes may be uninstalled on a level of an operating system. Therefore, the technical effect of protecting the local data can be really realized.

For better understanding, the above technical solution is described in detail hereinafter in conjunction with drawings and the embodiments.

Figure 1:
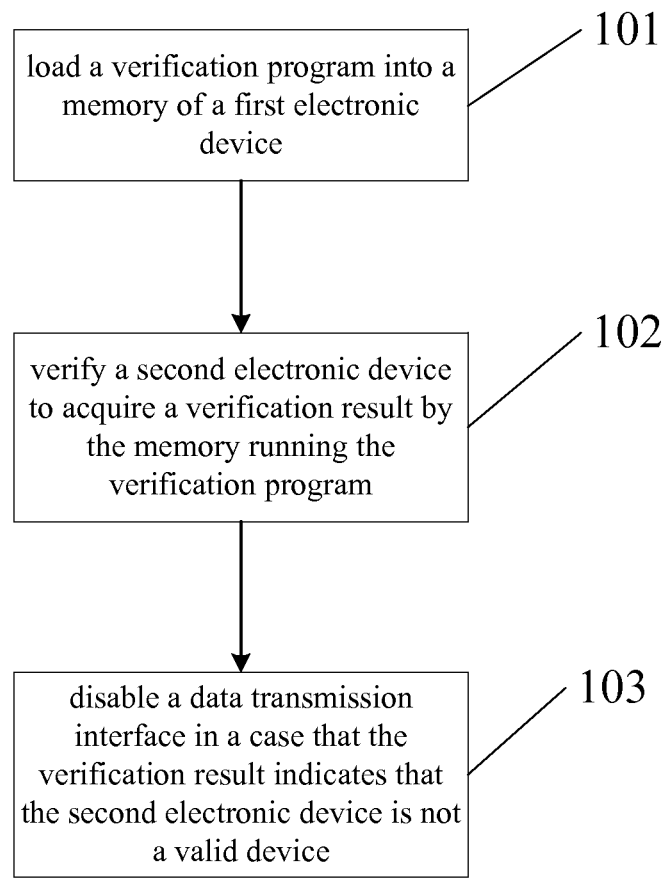
FIG. 1 is a flow chart of a method for protecting data according to an embodiment of the present application.

A method for protecting data for a first electronic apparatus with a data transmission interface is provided in an embodiment of the present application, wherein the first electronic device is capable of performing data transmission with a second electronic device by the data transmission interface; and a basic I/O system of the first electronic device is provided with a verification program for verifying the second electronic device. Referring to FIG. 1, which is a flow chart of a method for protecting data according to an embodiment of the present application, as shown in FIG. 1, the method includes steps 101 to 103.

The step 101 is to load the verification program into a memory of the first electronic device.

The step 102 is to verify the second electronic device to acquire a verification result by the memory running the verification program.

The step 103 is to disable the data transmission interface to cause the second electronic device to be unable to perform data transmission with the first electronic device by the data transmission interface in a case that the verification result indicates that the second electronic device is not a valid device.

Specifically, in an embodiment of the present application, the step 101 is configured to load the verification program from the basic I/O system into the memory of the first electronic device. For example, in a case that the first electronic device is a computer, the computer is capable of performing data transmission with the second electronic device by a USB interface, and the basic I/O system of the computer is provided with a verification program for verifying a second electronic device. In a case that the second electronic device is inserted into the USB interface, the basic I/O system of the computer may acquire the information that the USB interface is being used and the information related to the second electronic device. At this time, the computer loads the verification program from the basic I/O system into the memory.

In another embodiment of the present application, the step 101 may be further configured to load the verification program from the basic I/O system into a hard disk of the first electronic device firstly and then load the verification program from the hard disk into the memory of the first electronic device. For example, in a case that the first electronic device is a computer, the computer is capable of performing data transmission with the second electronic device by a USB interface, and the basic I/O system of the computer is provided with a verification program for verifying the second electronic device. In a case that the second electronic device is inserted into the USB interface, the basic I/O system of the computer may acquire the information that the USB interface is being used and the information related to the second electronic device. At this time, the computer loads the verification program from the basic I/O system into the hard disk firstly and then loads the verification program from the hard disk into the memory.

In a practical application, the first electronic device may be other electronic device such as an ipad, as long as that the electronic device is capable of performing data transmission with the second electronic device by the data transmission interface, and the basic I/O system of the electronic device is provided with a verification program for verifying the second electronic device.

After loading the verification program into the memory of the first electronic device in the step 101, the method according to the embodiment of the present application goes to the step 102: verifying the second electronic device to acquire a verification result by the memory running the verification program.

Specifically, in an embodiment of the present application, in a case that the first electronic device is a computer and the second electronic device is a U disk, the computer is capable of performing data transmission with the U disk by a USB interface, and the basic I/O system of the computer includes a verification program for verifying the U disk. After the U disk is inserted into the USB interface, the basic I/O system of the computer may acquire the information that the USB interface in being used and the information related to the U disk. After loading the verification program into the memory, the computer verifies the U disk by the memory running the verification program. The verifying manner may be verifying whether the type of the second electronic device matches a type of the preset electronic device, for example, whether the type of the U disk matches the type of the preset electronic device.

In a practical application, the second electronic device may be other electronic device such as a mobile phone. Therefore, the verifying manner may also be other verifying manner. For example, in a case that a mobile phone is connected to a computer by a USB interface, the computer may acquire a MAC (Medium/Media Access Control) address of the mobile phone. At this time, the verifying manner may be verifying whether the MAC address of the mobile phone matches a preset MAC address of the electronic device, as long as that the first electronic device is capable of verifying whether the second electronic device is a valid device.

After the step 102 of verifying the second electronic device to acquire a verification result, i.e., by the memory running the verification program, the method according to the embodiment of the present application goes to the step 103: disabling the data transmission interface to cause the second electronic device to be unable to perform data transmission with the first electronic device by the data transmission interface in a case that the verification result indicates that the second electronic device is not a valid device.

Specifically, in an embodiment of the present application, the first electronic device is a computer and the second electronic device is a U disk. In a case that the U disk is inserted into the USB interface, after loading the verification program into the memory, the computer verifies the U disk by the memory running the verification program, and in a case that the verification result indicates that the type of the U disk does not match the type of the preset electronic device, i.e., the U disk is not a valid device. At this time, the computer may disable the USB interface, i.e., the U disk is unable to perform data transmission with the computer by the USB interface, by stopping supplying power to the USB interface.

In a practical application, in a case that the verification result indicates that the second electronic device is not a valid device, the first electronic device may disable the data transmission interface in other ways, for example, uninstalling the drive program of the data transmission interface to cause the second electronic device to be unable to perform data transmission with the first electronic device by the data transmission interface, as long as that the first electronic device may disable the data transmission interface to cause the second electronic device to be unable to perform data transmission with the first electronic device by the data transmission interface.

Optionally, after loading the verification program into the memory of the first electronic device, the method may further include: acquiring at least one monitoring program including a first monitoring program for monitoring the verification program by copying the verification program, wherein each of the at least one monitoring program is the same as the verification program.

Furthermore, in a case that the at least one monitoring program includes only the first monitoring program, after acquiring the at least one monitoring program including the first monitoring program for monitoring the verification program, the method may further include: loading the verification program into the memory of the first electronic device, in a case that it is detected that the first monitoring program or the verification program does not exist, by the first monitoring program and the verification program monitoring each other.

Specifically, in an embodiment of the present application, after loading the verification program into the memory of the computer, the computer acquires at least one monitoring program by copying the verification program in the memory, wherein the monitoring program is used for monitoring the verification program, and each of the at least one monitoring program is the same as the verification program. After acquiring the at least one monitoring program including the first monitoring program for monitoring the verification program, the verification program may be reloaded into the memory of the computer, in a case that it is detected that the first monitoring program or the verification program does not exist, by the first monitoring program and the verification program monitoring each other.

Optionally, after acquiring the verification result, the method may further include: enabling the data transmission interface to cause the second electronic device to be capable of performing data transmission with the first electronic device by the data transmission interface, in a case that the verification result indicates that the second electronic device is a valid device.

Specifically, in an embodiment of the present application, the first electronic device may be a computer and the second electronic device may be a U disk. In a case that the U disk is inserted into the USB interface, after loading the verification program into the memory, the computer verifies the U disk by the memory running the verification program, and the verification result indicates that the type of the U disk matches the type of the preset electronic device, i.e., the U disk is a valid device. At this time, the computer may enable the USB interface, i.e., the U disk is able to perform data transmission with the computer by the USB interface, by recovering to supply power to the USB interface.

In a practical application, in a case that the verification result indicates that the second electronic device is a valid device, the first electronic device may enable the data transmission interface in other ways, for example, loading the drive program of the data transmission interface to cause the second electronic device to be capable of performing data transmission with the first electronic device by the data transmission interface, as long as that the first electronic device may enable the data transmission interface to cause the second electronic device to be capable of performing data transmission with the first electronic device by the data transmission interface.

From the above detailed description of the implementing process of the method for protecting data according to the embodiment, the following technical issue in the conventional technology is addressed: in case of filtering a data transmission device by using driver layer codes, the local data can not be really protected since the driver layer codes may be uninstalled on a level of an operating system. Therefore, the technical effect of protecting the local data can be really realized.

Figure 2:
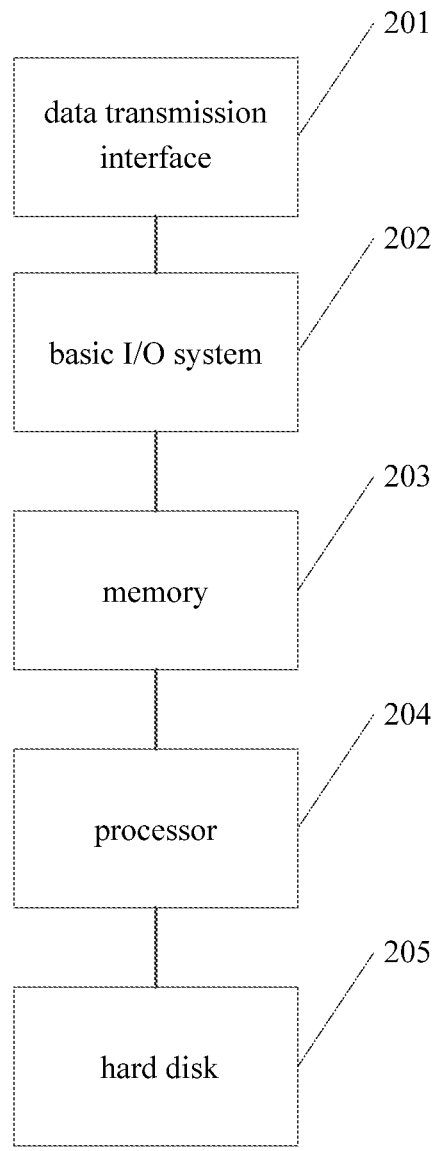
FIG. 2 is a functional block diagram of an electronic device according to an embodiment of the present application.

On the basis of the same inventive concept, an electronic device for protecting data is further provided in an embodiment of the present application. Referring to FIG. 2, the electronic device includes: a data transmission interface 201, by which the electronic device is capable of performing data transmission with a second electronic device; a basic I/O system 202 provided with a verification program for verifying the second electronic device; a memory 203; and a processor 204 configured to load the verification program into the memory 203 in a case that the second electronic device is connected to the electronic device by the data transmission interface 201, verify the second electronic device to acquire a verification result by the memory 203 running the verification program, and disable the data transmission interface 201 to cause the second electronic device to be unable to perform data transmission with the electronic device by the data transmission interface 201 in a case that the verification result indicates that the second electronic device is not a valid device.

Optionally, the processor 204 may be configured to load the verification program from the basic I/O system 202 into the memory 203.

Optionally, the electronic device may further include a hard disk 205, and the processor 204 may be further configured to load the verification program from the basic I/O system 202 into the hard disk 205.

Optionally, the processor 204 may be further configured to load the verification program from the hard disk 205 into the memory 203.

Optionally, the processor 204 may be further configured to acquire at least one monitoring program including a first monitoring program for monitoring the verification program by copying the verification program, wherein each of the at least one monitoring program is the same as the verification program.

Optionally, the processor 204 may be further configured to reload the verification program into the memory 203, in a case that it is detected that the first monitoring program or the verification program does not exist, by the first monitoring program and the verification program monitoring each other.

Optionally, the processor 204 may be further configured to enable the data transmission interface 201 to cause the second electronic device to be able to perform data transmission with the electronic device by the data transmission interface 201, in a case that the verification result indicates that the second electronic device is a valid device.

The electronic device according to this embodiment and the method for protecting data according to FIG. 1 and modifications of the embodiments are based on the same inventive concept. From the detailed description of the above-mentioned method for protecting data and various variations thereof, the implementing process of the electronic device according to this embodiment can be clearly understood by those skilled in the art, which is not described herein for conciseness of the Specification.

According to one or more embodiments described above of the present application, at least the following technical effects may be realized.

The basic I/O system of a first electronic device is provided with a verification program for verifying the second electronic device. The verification program is loaded into a memory of the first electronic device. The second electronic device is verified to acquire a verification result by the memory running the verification program. A data transmission interface is disabled to cause the second electronic device to be unable to perform data transmission with the first electronic device by the data transmission interface in a case that the verification result indicates that the second electronic device is not a valid device. Therefore, according to the method of the embodiment, codes for filtering the second electronic device are written into the basic I/O system and thus the codes can not be deleted on a level of an operating system. Accordingly, the following technical issue in the conventional technology is addressed: in case of filtering a data transmission device by using driver layer codes, the local data can not be really protected since the driver layer codes may be uninstalled on a level of an operating system. Therefore, the technical effect of protecting the local data can be really realized.

It should be understood by those skilled in the art that, the embodiments according to the present application may be implemented as a method, system or computer program product. Hence, the embodiments of the invention may be implemented with hardware only, with software only, or with a combination of hardware and software. Furthermore, the embodiments of the present application may be embodied as computer program products implemented on one or multiple computer readable media (including but not limited to magnetic disk storage, CD-ROM, optical storage, etc.) including computer executable codes.

The description in this application is made in conjunction with flowchart(s) and/or block diagram(s) of the method, device (system) or computer program product according to the embodiments of the application. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to generate a machine, in which device(s) to implement functions specified in one or more processes of the flowchart and/or one or more blocks of the block diagram are implemented through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Preferred embodiments of the present application have been described, while alterations and modifications may be made to the embodiments by those skilled in the art based on basic creative concepts of the present application. Therefore, appended claims are intended to include the preferred embodiments and all the alterations and modifications falling within the scope of protection of the present application.

Apparently, various modifications and variations may be made by those skilled in the art without deviating from the spirit and scope of the present application. Therefore, if the modifications and variations fall within the scope of the claims and equivalent techniques of the present application, the present application is intended to include the modifications and variations.

The invention claimed is:

1. A method of protecting data for a first electronic device with a data transmission interface, the first electronic device being capable of performing data transmission with a second electronic device over the data transmission interface, a basic I/O system of the first electronic device being provided with a verification program for verifying the second electronic device, the method comprising:
   in response to the second electronic device being connected to the first electronic device by the data transmission interface, loading the verification program into a memory of the first electronic device;
   generating a verification result indicating validity of the second electronic device by running the verification program on the first electronic device from the memory;
   in response to the verification result indicating that the second electronic device is not a valid device, disabling the data transmission interface to prevent the second electronic device from performing data transmission with the first electronic device over the data transmission interface;
   after loading the verification program into the memory of the first electronic device, acquiring at least one monitoring program including a first monitoring program for monitoring the verification program by copying the verification program, each of the at least one monitoring program being the same as the verification program; and
   after acquiring the first monitoring program and in response to the verification program not being detected, reloading the verification program into the memory of the first electronic device by the first monitoring program.

2. The method according to claim 1, wherein the loading the verification program into the memory of the first electronic device comprises:
   loading the verification program from the basic I/O system into the memory of the first electronic device.

3. The method according to claim 2, further comprising, after generating the verification result and in response to the verification result indicating that the second electronic device is the valid device, enabling the data transmission interface to allow the second electronic device to perform data transmission with the first electronic device over the data transmission interface.

4. The method according to claim 1, further comprising, before loading the verification program into the memory of the first electronic device loading the verification program from the basic I/O system into a hard disk of the first electronic device.

5. The method according to claim 4, wherein the loading the verification program into the memory of the first electronic device comprises:
   loading the verification program from the hard disk into the memory of the first electronic device.

6. The method according to claim 5, further comprising, after generating the verification result and in response to the verification result indicating that the second electronic device is the valid device, enabling the data transmission interface to allow the second electronic device to perform data transmission with the first electronic device over the data transmission interface.

7. The method according to claim 4, further comprising, after generating the verification result and in response to the verification result indicating that the second electronic device is a valid device, enabling the data transmission interface to allow the second electronic device to perform data transmission with the first electronic device over the data transmission interface.

8. The method according to claim 1, further comprising, after generating the verification result and in response to the verification result indicating that the second electronic device is the valid device, enabling the data transmission interface to allow the second electronic device to perform data transmission with the first electronic device over the data transmission interface.

9. An electronic device, comprising:
   a data transmission interface, over which the electronic device is capable of performing data transmission with a second electronic device;
   a basic I/O system provided with a verification program for verifying the second electronic device;
   a memory;
   a processor configured to:
      load the verification program into the memory in response to the second electronic device being connected to the electronic device by the data transmission interface;
      generate a verification result indicating validity of the second electronic device by running the verification program on the electronic device from the memory;
      in response to the verification result indicating that the second electronic device is not a valid device, disable the data transmission interface to prevent the second electronic device from performing data transmission with the electronic device over the data transmission interface;
      monitor the verification program by acquiring at least one monitoring program including a first monitoring program for monitoring the verification program, wherein the acquiring includes copying the verification program, and each of the at least one monitoring program is the same as the verification program; and
      in response to the verification program not being detected, reload the verification program into the memory by the first monitoring program.

10. The electronic device according to claim 9, wherein the processor is configured to load the verification program from the basic I/O system into the memory.

11. The electronic device according to claim 10, wherein the processor is configured to, in response to the verification result indicating that the second electronic device is the valid device, enable the data transmission interface to allow the second electronic device to perform data transmission with the electronic device over the data transmission interface.

12. The electronic device according to claim 9, wherein:
   the electronic device further comprises a hard disk; and
   the processor is further configured to load the verification program from the basic I/O system into the hard disk.

13. The electronic device according to claim 12, wherein the processor is further configured to load the verification program from the hard disk into the memory.

14. The electronic device according to claim 9, wherein the processor is configured to, in response to the verification result indicating that the second electronic device is the valid device, enable the data transmission interface to allow the second electronic device to perform data transmission with the electronic device over the data transmission interface.

\* \* \* \* \*